(12) United States Patent
Kim et al.

(10) Patent No.: US 8,963,837 B2
(45) Date of Patent: Feb. 24, 2015

(54) MOBILE TERMINAL AND CONTROLLING METHOD THEREOF

(75) Inventors: Byoungeul Kim, Seoul (KR); Yeongkyu Lim, Gwangmyeong-si (KR); Seehyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/365,118

(22) Filed: Feb. 2, 2012

(65) Prior Publication Data

US 2012/0319948 A1 Dec. 20, 2012

(30) Foreign Application Priority Data

Jun. 14, 2011 (KR) ........................ 10-2011-0057268

(51) Int. Cl.
*G06F 3/041* (2006.01)
*G06F 3/0488* (2013.01)

(52) U.S. Cl.
CPC .................................. *G06F 3/04883* (2013.01)
USPC ........................................... 345/158; 345/173

(58) Field of Classification Search
USPC ................. 345/173–175; 178/18.06
See application file for complete search history.

(56) References Cited

U.S. PATENT DOCUMENTS

| | | | | |
|---|---|---|---|---|
| 8,174,503 | B2 * | 5/2012 | Chin .............................. | 345/173 |
| 8,542,251 | B1 * | 9/2013 | Gossweiler et al. .......... | 345/649 |
| 2008/0048997 | A1 * | 2/2008 | Gillespie et al. .............. | 345/174 |
| 2009/0284495 | A1 * | 11/2009 | Geaghan et al. .............. | 345/174 |
| 2010/0097324 | A1 * | 4/2010 | Anson et al. ................... | 345/173 |
| 2011/0007031 | A1 * | 1/2011 | Mori .............................. | 345/174 |
| 2011/0072400 | A1 * | 3/2011 | Watanabe et al. ............. | 715/863 |
| 2011/0316797 | A1 * | 12/2011 | Johansson ...................... | 345/173 |
| 2012/0154313 | A1 * | 6/2012 | Au et al. ........................ | 345/173 |
| 2012/0200515 | A1 * | 8/2012 | Yamada ......................... | 345/173 |
| 2013/0057496 | A1 * | 3/2013 | Hong et al. .................... | 345/173 |
| 2013/0113723 | A1 * | 5/2013 | Chen et al. .................... | 345/173 |
| 2013/0150128 | A1 * | 6/2013 | Tsunoda ........................ | 455/566 |
| 2013/0160095 | A1 * | 6/2013 | Seleznyov ........................ | 726/5 |
| 2013/0244574 | A1 * | 9/2013 | Okuno et al. ................. | 455/26.1 |

FOREIGN PATENT DOCUMENTS

KR 1020100051454 5/2010

* cited by examiner

*Primary Examiner* — Kent Chang
*Assistant Examiner* — Nelson Rosario
(74) *Attorney, Agent, or Firm* — Lee, Hong, Degerman, Kang & Waimey

(57) ABSTRACT

According to one embodiment, a mobile terminal includes: a touchscreen configured to display a first menu and receive a plurality of touch inputs of a first pattern via the first menu and to display a second menu and receive a plurality of touch inputs of a second pattern via the second menu; and a controller configured to: calculate a first moving distance of a pointer for each of the received touch inputs of the first pattern; determine a minimum among the plurality of calculated first moving distances; calculate a second moving distance of the pointer for each of the received touch inputs of the second pattern; determine a maximum among the plurality of calculated second moving distances; and determine a threshold moving distance of the pointer for discriminating the touch input of the first pattern from the touch input of the second pattern by using the minimum and the maximum.

18 Claims, 19 Drawing Sheets

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0057268, filed on Jun. 14, 2011, the contents of which are hereby incorporated by reference herein in its entirety.

FIELD OF THE INVENTION

Embodiments of the present invention relate to a mobile terminal, and more particularly, to a mobile terminal and a method of controlling the mobile terminal. Although features disclosed are suitable for a wide scope of applications, they are particularly suitable for providing a user interface capable of setting a threshold distance of a pointer in order to distinguish a plurality of touch inputs from one another in a convenient manner.

DISCUSSION OF THE RELATED ART

Terminals can generally be classified as mobile/portable terminals or stationary terminals. The mobile terminals can be further classified as handheld terminals or vehicle mount terminals according whether users can personally carry the mobile terminals.

As functions of mobile terminals become increasingly diversified, a mobile terminal may be implemented as a multimedia player capable of providing multiple functions such as capturing of photographs or moving pictures, playback of music or video files, game play, and broadcast reception.

To support an increase of mobile terminal functionality, improvement of structural parts and/or software parts of the mobile terminal is considered.

According to a recent trend, mobile terminals are equipped with a user interface facilitating menu selection or execution of an application receiving a touch input via a touchscreen. Therefore, a demand for facilitating use of a touch input to operate a mobile terminal is rising.

SUMMARY

Accordingly, embodiments of the present invention are directed to a mobile terminal and a method of controlling the mobile terminal that may substantially obviate one or more problems due to limitations and disadvantages of the related art.

One aspect of the present invention is directed to providing a user interface to facilitate determination of a threshold distance of a pointer for differentiating a plurality of touch inputs, the determination of the threshold distance based on a plurality of previously input touch inputs.

Additional aspects and features of the invention will be set forth in the description which follows and will become apparent to those having ordinary skill in the art upon examination of the following or may be learned from practice of the invention. Other aspects of the invention may be realized and attained by the structure particularly pointed out in the written description and claims herein as well as the appended drawings.

According to one embodiment, a mobile terminal includes: a touchscreen configured to display a first menu and receive a plurality of touch inputs of a first pattern via the first menu and to display a second menu and receive a plurality of touch inputs of a second pattern via the second menu; and a controller configured to: calculate a first moving distance of a pointer for each of the received plurality of touch inputs of the first pattern; determine a minimum moving distance among the plurality of calculated first moving distances; calculate a second moving distance of the pointer for each of the received plurality of touch inputs of the second pattern; determine a maximum moving distance among the plurality of calculated second moving distances; and determine a threshold moving distance of the pointer for discriminating the touch input of the first pattern from the touch input of the second pattern by using the minimum moving distance and the maximum moving distance.

According to another embodiment, a method of controlling a mobile terminal includes displaying, by a touchscreen, a first menu for receiving a plurality of touch inputs of a first pattern; displaying, by the touchscreen, a second menu for receiving a plurality of touch inputs of a second pattern; calculating, by a controller, a first moving distance of a pointer for each of the received plurality of touch inputs of the first pattern; determining, by the controller, a minimum moving distance among the plurality of first moving distances; calculating, by the controller, a second moving distance of a pointer for each of the received plurality of touch inputs of the second pattern; determining, by the controller, a maximum moving distance among the plurality of first moving distances; and determining, by the controller, a threshold moving distance of the pointer for discriminating the touch input of the first pattern from the touch input of the second pattern by using the minimum moving distance and the maximum moving distance.

Accordingly, aspects of the present invention are as follows. A threshold moving distance of a pointer may be determined in order to differentiate a plurality of touch inputs more effectively. For example, the touch inputs may include a touch input of a first pattern (i.e., a flicking input) and a touch input of a second pattern (i.e., a touch input for selecting an icon or menu). A threshold distance of a pointer may be an average value of a distance corresponding to the touch inputs of the first pattern and a distance corresponding to the touch inputs of the first pattern.

It is to be understood that both the foregoing general description and the following detailed description are exemplary and explanatory in nature and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles and features of embodiments of the invention. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to describe elements in order to facilitate discussion of the disclosure. Therefore, significant meanings or roles are not assigned to the suffixes themselves, and it is understood that the terms 'module', 'unit' and 'part' can be used together or interchangeably.

Various types of terminals may be implemented using the various techniques or features described herein. Examples of such terminals include mobile terminals as well as stationary terminals. Such terminals may include mobile phones, user equipment, smart phones, digital television (DTV) terminals, computers, digital broadcast terminals, personal digital assistants, portable multimedia players (PMPs), and navigators. For convenience of description, embodiments will be described with reference to a mobile terminal 100. It is understood that described features may be applied in other types of terminals.

Figure 1:
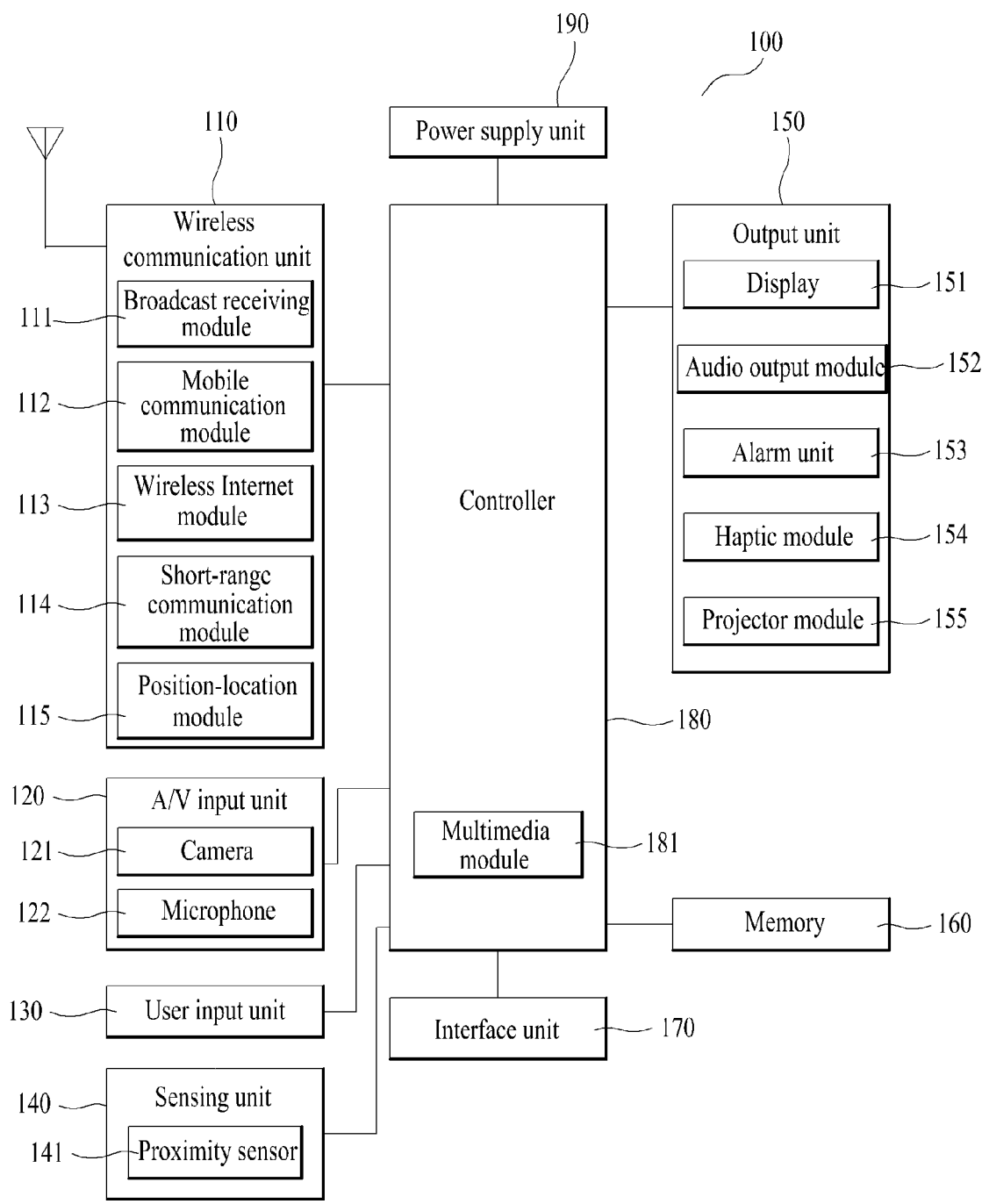
FIG. 1 is a block diagram of a mobile terminal according to an embodiment of the present invention.

FIG. 1 is a block diagram of a mobile terminal 100 in accordance with an embodiment of the present invention. With reference to FIG. 1, the mobile terminal 100 has a wireless communication unit 110, an audio/video (A/V) input unit 120, a user input unit 130, a sensing unit 140, an output unit 150, a memory 160, an interface unit 170, a controller 180, and a power supply unit 190. Although the mobile terminal 100 is illustrated as having various components, it is understood that implementing all of the illustrated components is not essential and that more or fewer components may be implemented according to alternative embodiments.

The wireless communication unit 110 may include one or more components which enable wireless communication between the mobile terminal 100 and a wireless communication system or network in which the mobile terminal 100 is located. For instance, the wireless communication unit 110 may include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may be a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in the memory 160.

The broadcast signal may be implemented, among other signals, as a TV broadcast signal, a radio broadcast signal, or a data broadcast signal. If desired, the broadcast signal may further include a combined TV and radio broadcast signal.

The broadcast associated information may include information associated with a broadcast channel, a broadcast program, or a broadcast service provider. The broadcast associated information may also be provided via a mobile communication network. In this case, the broadcast associated information may be received by the mobile communication module 112.

The broadcast associated information may be implemented in various forms. For instance, the broadcast associated information may be implemented to include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems such as digital multimedia broadcasting-terrestrial (DMB-T), digital multimedia broadcasting-satellite (DMB-S), digital video broadcast-handheld (DVB-H), the data broadcasting system known as media forward link only (MediaFLO™) and integrated services digital broadcast-terrestrial (ISDB-T). Optionally, the broadcast receiving module 111 may be configured to be suitable for other broadcasting systems as well as the previously-identified digital broadcasting systems.

The mobile communication module 112 transmits wireless signals to and/or receives wireless signals from one or more network entities (e.g., a base station, an external terminal, or a server). Such wireless signals may carry audio, video, and text/multimedia messages.

The wireless Internet module 113 supports Internet access for the mobile terminal 100. The wireless Internet module 113 may be internally or externally coupled to the mobile terminal 100. The wireless Internet module 113 may use various wireless Internet technologies such as wireless local area network (WLAN), Wi-Fi™, Wireless broadband (Wibro™), World Interoperability for Microwave Access (Wimax™), and High Speed Downlink Packet Access (HSDPA).

The short-range communication module 114 facilitates relatively short-range communications. Suitable technologies used by the short-range communication module 114 include radio frequency identification (RFID), infrared data association (IrDA), and ultra-wideband (UWB), as well as the networking technologies commonly referred to as Bluetooth™ and ZigBee™.

The position-location module 115 identifies or otherwise obtains the location of the mobile terminal 100. If desired, the position-location module 115 may be implemented with a global positioning system (GPS) module.

The audio/video (A/V) input unit 120 provides audio or video input signals to the mobile terminal 100. The A/V input unit 120 may include a camera 121 and a microphone 122.

The camera 121 receives and processes image frames such as still images (pictures) or moving images (video), which are obtained by an image sensor operating in a video call mode or a photographing mode. The processed image frames may be displayed by the display 151.

The image frames processed by the camera 121 may be stored in the memory 160 or may be externally transmitted to an external device via the wireless communication unit 110. The mobile terminal may include two or more cameras 121 based on the needs of a user.

The microphone 122 receives an external audio signal while the mobile terminal 100 is operating in a particular mode, such as a phone call mode, a recording mode or a voice recognition mode. The audio signal is processed and converted into electronic audio data. The processed audio data is transformed into a format that can be transmitted to a mobile communication base station via the mobile communication module 112 during a phone call mode. The microphone 122 may use assorted noise removal algorithms to remove noise generated in the course of receiving the external audio signal.

The user input unit 130 generates input data in response to user manipulation of an associated input device or input devices. Examples of such devices include a keypad, a dome switch, a static pressure or capacitive touchpad, a jog wheel, and a jog switch.

The sensing unit 140 provides sensing signals for controlling operations of the mobile terminal 100 that use status measurements regarding various aspects of the mobile terminal. For instance, the sensing unit 140 may detect an opened or closed state of the mobile terminal 100, a relative positioning of components of the mobile terminal (e.g., a display and keypad), a change of position of the mobile terminal or a component of the mobile terminal, a presence of user contact with the mobile terminal, an orientation of the mobile terminal, or an acceleration or deceleration of the mobile terminal.

For example, if the mobile terminal 100 is configured as a slide-type mobile terminal, the sensing unit 140 may sense whether a sliding portion of the mobile terminal is in an open or closed position. As other examples, the sensing unit 140 may sense the power provided by the power supply unit 190 or the presence of a coupling or other connection between the interface unit 170 and an external device. If desired, the sensing unit 140 may include a proximity sensor 141.

The proximity sensor 141 of the sensing unit 140 may be located in an internal region of the mobile terminal 100 surrounded by a touchscreen, or near the touchscreen. The proximity sensor 141 may detect the presence of an object approaching a certain sensing surface or an object located near the proximity sensor based on an electromagnetic field strength or an infrared ray without mechanical contact. The proximity sensor 141 may be more durable than a contact type sensor and may be suitable for more utility applications relative to the contact type sensor.

The proximity sensor 141 may include at least a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. When the touchscreen includes the electrostatic capacity proximity sensor, it may also be configured to detect a proximity of a pointer using a variation of an electric field according to the proximity of the pointer. In this situation, the touchscreen (touch sensor) may be considered as a proximity sensor 141.

For convenience of description, an action in which a pointer approaches the touchscreen without actually contacting the touchscreen (but is effectively recognized as a touch of the touchscreen) may be referred to as a 'proximity touch.' An action in which a pointer actually touches the touchscreen may be referred to as a 'contact touch'. The position of the touchscreen that is proximity-touched by the pointer may refer to a portion of the touchscreen that is vertically opposite the pointer when the pointer performs the proximity touch.

The proximity sensor 141 may detect a proximity touch and a proximity touch pattern (e.g., a proximity touch distance, a proximity touch duration, a proximity touch position, a proximity touch shift state). In addition, information corresponding to the detected proximity touch action and the detected proximity touch pattern may be output to the touchscreen.

The output unit 150 generates outputs that may be detected by the senses of sight, hearing and/or touch. The output unit 150 may include a display 151, an audio output module 152, an alarm unit 153, a haptic module 154, and a projector module 155.

The display 151 may display information associated with the mobile terminal 100. For instance, if the mobile terminal 100 is operating in a phone call mode, the display 151 may display a user interface (UI) or graphical user interface (GUI) which provides information associated with placing, conducting, or terminating a phone call. As another example, if the mobile terminal 100 is operating in a video call mode or a photographing mode, the display 151 may display images which are associated with these modes or a UI or a GUI that provides information associated with these modes.

The display 151 may be implemented using known display technologies including, for example, a liquid crystal display (LCD), a thin film transistor-liquid crystal display (TFT-LCD), an organic light-emitting diode display (OLED), a flexible display or a three-dimensional display. The mobile terminal 100 may include one or more of such displays 151.

Some of the displays 151 may be implemented as a transparent or optical transmissive type display, which may be referred to as a transparent display. A representative example of a transparent display is the transparent OLED (TOLED). A rear of the display 151 can be implemented using an optical transmissive type display as well. Accordingly, a user may be able to see an object located behind the body of the mobile terminal 100 through the transparent portion of the display 151 on the body of the mobile terminal.

According to one embodiment, the mobile terminal 100 may include at least two displays 151. For instance, a plurality of displays 151 may be arranged on a single surface of the mobile terminal 100. The displays 151 may be spaced apart from each other or may be integrated as one body. Alternatively, a plurality of displays 151 may be arranged on different surfaces of the mobile terminal 100.

If the display 151 and a sensor for detecting a touch action (i.e., a touch sensor) form a mutual layer structure (i.e., a touchscreen), the display 151 may be used as an input device as well as an output device. In this situation, the touch sensor may be a touch film, a touch sheet, or a touchpad.

The touch sensor may be configured to convert a pressure applied to a specific portion of the display 151 or a variation of a capacitance generated at a specific portion of the display 151 to an electric input signal. Moreover, the touch sensor may detect a pressure, a position, or a size of a touch input.

When a user applies a touch input to the touch sensor, signal(s) corresponding to the touch input may be transferred to a touch controller. The touch controller may then process the signal(s) and then transfer the processed signal(s) to the controller 180. Accordingly, the controller 180 is made aware whether a certain portion of the display 151 is touched.

The audio output module 152 may operate in various modes including a call-receiving mode, a call-placing mode, a recording mode, a voice recognition mode, or a broadcast reception mode in order to output audio data which is received from the wireless communication unit 110 or stored in the memory 160. During operation, the audio output module 152 outputs audio relating to a particular function (e.g., call received, message received). The audio output module 152 may be implemented using at least a speaker, a buzzer, another audio producing device, or a combination of such devices.

The alarm unit 153 may output a signal for announcing the occurrence of a particular event associated with the mobile terminal 100. Typical events include a call reception, a message reception, and a touch input reception.

The alarm unit 153 may output a signal for announcing an event occurrence by way of vibration as well as a video signal or an audio signal. The video signal may be output via the display 151. The audio signal may be output via the audio output module 152. Therefore, the display 151 or the audio output module 152 may be regarded as a part of the alarm unit 153.

The haptic module 154 may generate various tactile effects that can be sensed by a user. Vibration is a representative example of a tactile effect generated by the haptic module 154. A strength and pattern of the vibration generated by the haptic module 154 may be controllable. For instance, vibrations different from one another may be output in a manner of being synthesized together or may be sequentially output.

The haptic module 154 is able to generate various tactile effects as well as vibration. For instance, the haptic module 154 may generate an effect simulating an arrangement of pins vertically moving against a contact skin surface, an injection of air though an injection hole, a suction of air though a suction hole, a skim over a skin surface, a contact with an electrode, an electrostatic force, a production of heat using an endothermic device, or a production of cold using an exothermic device.

The haptic module 154 may be implemented such that a user may sense the tactile effect through muscular sense of a finger or an arm. The haptic module 154 may also transfer the tactile effect through a direct contact. According to an embodiment, the mobile terminal 100 may include at least two haptic modules 154.

The projector module 155 may operate as an image projector of the mobile terminal 100. The projector module 155 may be able to display an image, which is identical to or partially different from at least an image displayed on the display 151, on an external screen or a wall according to a control signal of the controller 180.

In particular, the projector module 155 may include a light source for generating light (e.g., a laser) for projecting an image, an image producing element for producing an image for output using the light generated from the light source, and a lens for enlarging the produced image at a predetermined focus distance. The projector module 155 may further include a device for adjusting an image projection direction by mechanically moving the lens or the entire projector module.

The projector module 155 can be classified as a cathode ray tube (CRT) module, a liquid crystal display (LCD) module, or a digital light processing (DLP) module according to a type of the device or a manner of display. In particular, the DLP module is operated by enabling light generated from the light source to reflect on a digital micro-mirror device (DMD) chip and can be advantageous for reducing a size of the projector module 155.

According to particular embodiments, the projector module 155 may be provided along a length direction of a lateral, front or back surface of the mobile terminal 100. It is understood that the projector module 155 may be provided at any portion of the mobile terminal 100 as needed.

The memory 160 may be used to store various types of data to support the processing, control, and storage requirements of the mobile terminal 100. Examples of such data include program instructions for applications operating in the mobile terminal 100, contact data, phonebook data, messages, audio, still pictures, and moving pictures. In addition, a recent usage history or a cumulative usage frequency of each piece of data (e.g., usage frequency for each phonebook data, each message or each piece of multimedia) can be stored in the memory 160. Moreover, data regarding various patterns of vibration and/or sound that are output when a touch input is applied to the touchscreen may be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or another similar memory or data storage device. The mobile terminal 100 may also operate in association with a web storage for performing a storage function of the memory 160 on the Internet.

The interface unit 170 may couple the mobile terminal 100 with external devices. The interface unit 170 may receive data or be supplied with power from the external devices, transfer the data or power to components of the mobile terminal 100, or facilitate transfer of data of the mobile terminal 100 to the external devices. The interface unit 170 may be configured using at least a wired/wireless headset port, an external charger port, a wired/wireless data port, a memory card port, a port for coupling to a device having an identity module, audio input/output ports, video input/output ports, or an earphone port.

The identity module may be a chip for storing various kinds of information for authenticating a usage authority of the mobile terminal 100. The identity module may include at least a User Identity Module (UIM), a Subscriber Identity Module (SIM), or a Universal Subscriber Identity Module (USIM). A device having the identity module (hereinafter referred to as an 'identity device') may be manufactured as a smart card. Therefore, the identity device is connectable to the mobile terminal 100 via a corresponding port.

When the mobile terminal 100 is connected to an external cradle, the interface unit 170 may serve as a passage for supplying the mobile terminal 100 with power from the cradle or a passage for delivering various command signals input by a user via the cradle to the mobile terminal 100. The various command signals input via the cradle or the power may operate as a signal enabling the mobile terminal 100 to recognize that it is correctly loaded in the cradle.

The controller 180 may control the overall operations of the mobile terminal 100. For example, the controller 180 may perform the control and processing associated with voice calls, data communications, or video calls. The controller 180 may include a multimedia module 181 that provides multimedia playback. The multimedia module 181 may be configured as part of the controller 180 or implemented as a separate component. Moreover, the controller 180 may perform a pattern recognizing process for recognizing handwriting input or picture-drawing input applied to the touchscreen as characters or images.

The power supply unit 190 provides power required by the various components of the mobile terminal 100. The power may be internal power, external power, or a combination of internal power and external power.

Various embodiments described herein may be implemented in a computer-readable medium using, for example, computer software, hardware, or a combination of computer software and hardware. According to a hardware implementation, embodiments described herein may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination of the noted devices. Feature described herein may also be implemented by the controller 180.

According to a software implementation, embodiments described herein may be implemented using separate software modules, such as procedures and functions, each of which perform one or more of the functions and operations described herein. Software code may be implemented using a software application written in a suitable programming language. The software may be stored in a memory device such as the memory 160, and may be executed by a controller or processor, such as the controller 180.

Figure 2:
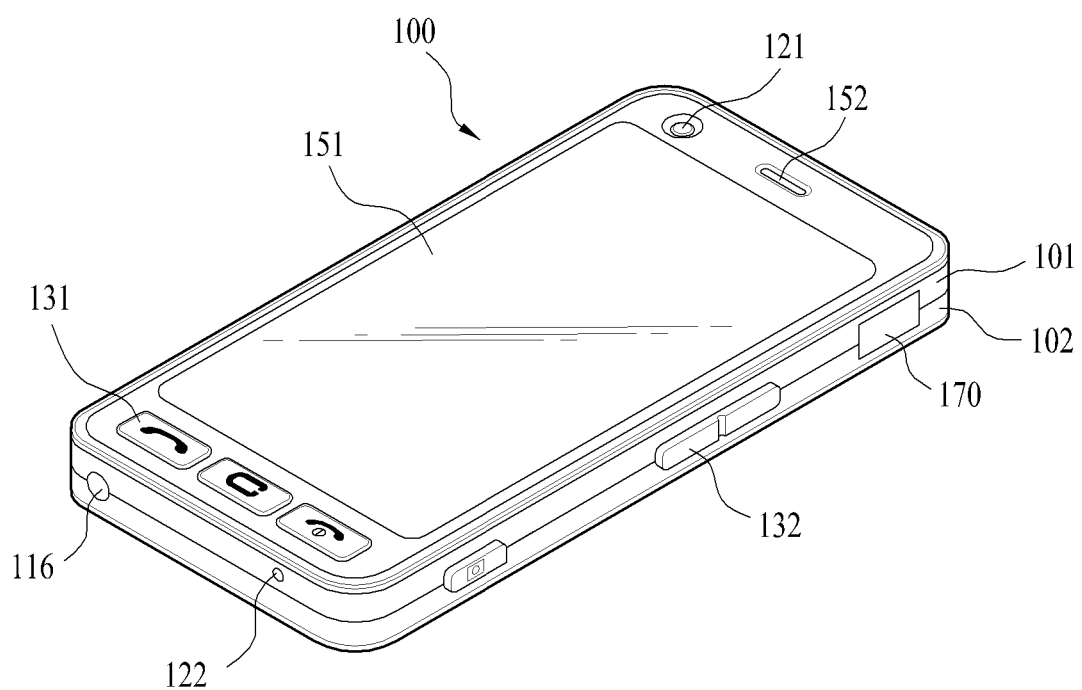
FIG. 2 is a front perspective view of a mobile terminal according to an embodiment of the present invention.

FIG. 2 is a front perspective diagram of a mobile terminal according to an embodiment of the present invention. The mobile terminal 100 has a bar type terminal body. However, according to other embodiments, the mobile terminal 100 may have other configurations including folder-type, slide-type, rotational-type, swing-type, or a combination of these configurations. For purposes of clarity, embodiments will be described with reference to a bar-type mobile terminal 100. However, it is understood that described features may apply equally to other types of mobile terminals.

With continued reference to FIG. 2, the mobile terminal 100 includes a case (casing, housing, or cover) forming an exterior of the mobile terminal. The case may be divided into a front case 101 and a rear case 102. Various electric/electronic components are positioned or otherwise located in a space or cavity defined between the front case 101 and the rear case 102. At least one middle case may also be provided between the front case 101 and the rear case 102. The cases 101 and 102 may be formed by injection molding of a synthetic resin or may be made of a metal material such as stainless steel (STS) or titanium (Ti).

The display 151, audio output module 152, camera 121, user input unit 130 (e.g., first and second operating units 131 and 132), microphone 122, and interface unit 170 may be arranged in the terminal body, and, more particularly, in the front case 101

The display 151 may occupy a majority of the area of a main face of the front case 101. The audio output module 152 and the camera 121 may be arranged in a region adjacent to an end portion of the display 151. The first operating unit 131 and the microphone 122 may be arranged in a region adjacent to the other end portion of the display 151. The second operating unit 132 and the interface unit 170 may be arranged on lateral sides of the front case 101 and the rear case 102.

The user input unit 130 is operable to receive a command for controlling operation of the mobile terminal 100. The user input unit 130 may include the first and second operating units 131 and 132. The first and second operating units 131 and 132 may be referred to as manipulating portions and may employ a tactile mechanism by which a user operates the first and second operating units by touch.

The first and second operating units 131 and 132 may receive various inputs. For instance, the first operating unit 131 may receive commands such as start, end, or scroll, and the second operating unit 132 may receive commands for controlling a volume adjustment of sound output from the audio output module 152, or for switching a mode of the display 151 to a touch recognition mode.

An operational relationship between the display 151 and a touchpad 135 (or touchscreen) is explained with reference to FIG. 3.

Figure 3:
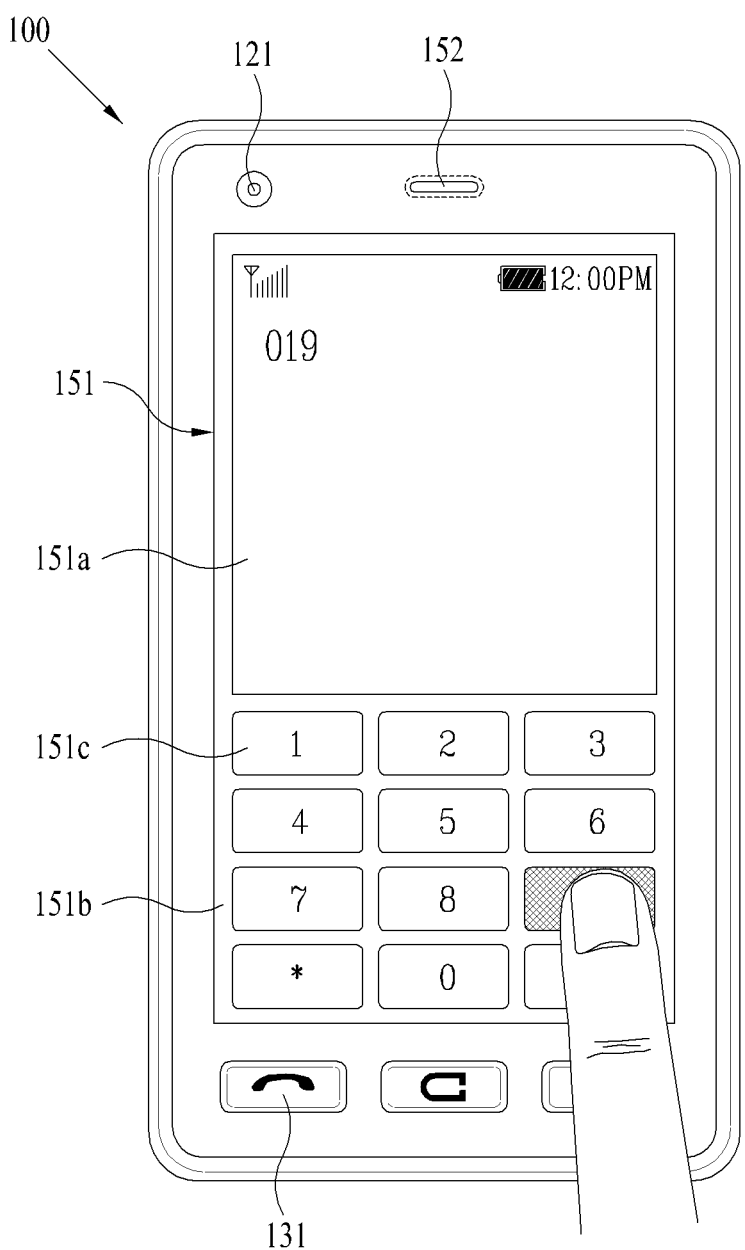
FIG. 3 is a view of a screen display of a mobile terminal according to an embodiment of the present invention for illustrating an operation of the mobile terminal.

FIG. 3 is a view of a screen display of a mobile terminal 100 according to an embodiment of the present invention. Various types of information may be displayed for viewing on the display 151. The information displayed may include characters, numerals, symbols, graphics, and icons. To facilitate input of information, at least characters, numerals, symbols, graphics or icons are presented as a single predetermined array in a formation of a keypad. The keypad may be referred to as 'soft keys'.

As illustrated in FIG. 3, a touch applied to a soft key is input via a front face of the mobile terminal 100. The display 151 is operable via an entire area of the display or one or more regions of the display. In the latter situation, a plurality of regions may be configured to be interoperable.

For instance, an output window 151a and an input window 151b are displayed on the display 151. A soft key 151c representing a digit for inputting a phone number, for example, is output to the input window 151b. If the soft key 151c is touched, a digit corresponding to the touched soft key is output to the output window 151a. If the first operating unit 131 is operated, a call connection for a phone number displayed on the output window 151a is attempted.

In addition, the display 151 may be configured to receive an input for scrolling. A user may scroll the display 151 to shift a cursor or pointer positioned at an entity (e.g., an icon) that is displayed on the display. Furthermore, if a finger is moved along the display 151, a path of the moving finger may be displayed on the display. This may be useful when editing an image displayed on the display 151.

The display (touch screen) 151 and the touchpad 135 may be touched together within a predetermined or threshold time range in order to cause an execution of a function of the mobile terminal 100. A simultaneous touch may occur when the body of the mobile terminal 100 is held by a user using a thumb and a first finger (clamping). The function that is executed may include activation or deactivation of the display 151 or the touchpad 135.

For convenience of description, it is understood that the mobile terminal 100 described herein with reference to various embodiments includes at least one of the components illustrated in FIG. 1. In addition, it is understood that, according to various embodiments, the display 151 of the mobile terminal 100 includes a touchscreen.

Generally speaking, a graphic having a shape such as that of an arrow or a finger for pointing at a specific object or for selecting a menu on the display 151 is referred to as a pointer or a cursor. However, the term 'pointer' may also be used to refer to a finger of a user or a stylus pen for performing a manipulation by touch.

Therefore, in order to more clearly distinguish the terms 'pointer' and 'cursor' from each other in the present disclosure, a graphic displayed on the display 151 shall be referred to as a 'cursor' and a physical entity for performing a touch, a proximity touch or a similar action (e.g., a finger or a stylus pen) shall be referred to as a 'pointer'.

According to a recent trend, mobile terminals are equipped with a user interface that facilitates user selection of a menu or execution of an application using a touch input via a touchscreen. In particular, a portion of a region including at least one menu or icon may be displayed on a touchscreen of the mobile terminal 100.

The user may select a menu, for example, by selecting the corresponding menu by touch. Moreover, the user may change a displayed region by selecting a certain point off of the displayed region with a touch.

In order to discriminate a flicking input for changing a displayed region from a touch input for selecting an icon or menu, a determination is made based on whether a moving distance of a pointer for the input (e.g., a distance by which the pointer moves along the display 151) exceeds a preset threshold distance. In particular, since a moving distance of a pointer used for performing a flicking input is greater than a moving distance of a pointer used for performing a touch input to select an icon, the controller 180 determines the corresponding input as a flicking input if the moving distance of the pointer exceeds the threshold distance. Otherwise, the controller 180 determines the corresponding input as a touch input.

However, respective threshold distances desired by (or suitable for) individual users may vary in length. According to the previously-described approach in which a flicking input and a touch input for selecting an icon are differentiated from each other based on a fixed threshold distance, a particular user may find it difficult to perform a desired input. This will be described in further detail with reference to FIGS. 4A and 4B.

Figure 4A:
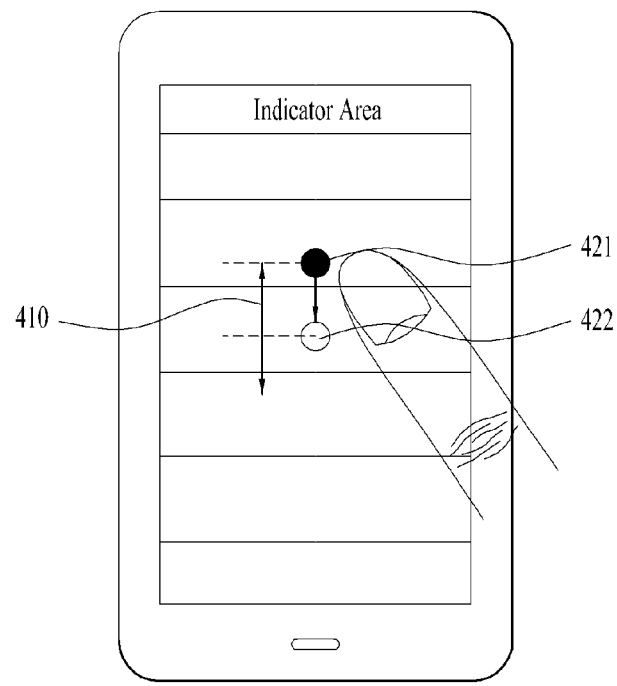
FIGS. 4A and 4B are views of screen displays for illustrating reception of a plurality of touch inputs.
Figure 4B:
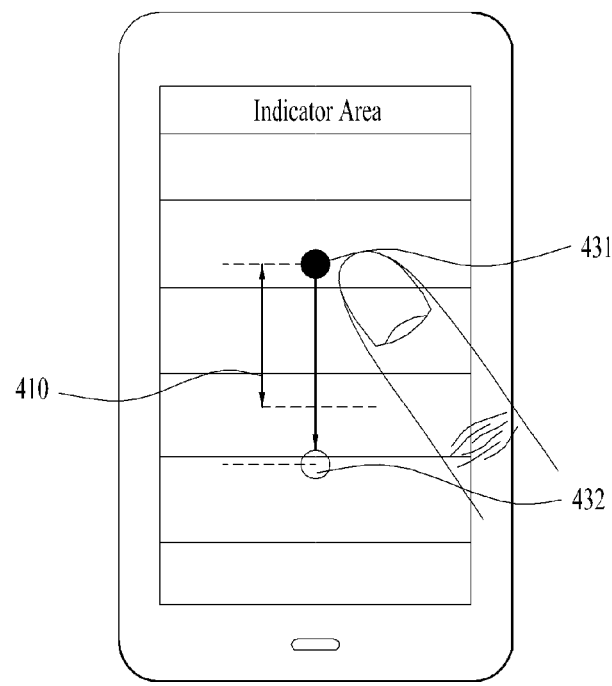

FIGS. 4A and 4B are views of screen displays for illustrating reception of a plurality of touch inputs. With reference to FIGS. 4A and 4B, a preset threshold distance 410 is illustrated, and a pointer is illustrated as a finger of a user.

Referring to FIG. 4A, a touch is input from a point 421 to a point 422 using a finger. Since the touch (or the movement distance of the finger between point 421 and point 422) does not exceed the threshold distance 410, the controller 180 treats the touch input of the user as a touch input for selecting a menu or an icon.

In another situation, illustrated in FIG. 4B, a touch is input from a point 431 to a point 432 using a finger. Since the touch (or the movement distance of the finger between point 431 and point 432) exceeds the threshold distance 410, the controller 180 treats the touch input of the user as a flicking input.

A user such as an elderly person who has a hand that is shaky may exceed the threshold distance 410 may be exceeded even when using his/her finger as a pointer intending to perform a touch input to select a menu. In this situation, the controller 180 treats the touch input as a flicking input even though the user intended to select a menu.

For certain users such as young people, it is possible that screen flicking is performed more often than touch inputs for selecting a menu. Yet, an intended flicking input may be treated as a touch input for selecting a menu.

Therefore, embodiments of the present invention are directed to a method of calibrating a threshold distance of a pointer in order to discriminate a flicking input from a touch input for selecting a menu or icon. The method of calibration may be based on reception of a plurality of flicking inputs or touch inputs from a particular user in advance.

According to an embodiment of the present invention, a plurality of flicking inputs and a plurality of touch inputs for selecting a plurality of menus or icons are received via a specific menu. An optimal pointer threshold moving distance is determined to facilitate differentiating a flicking input from a touch input for selecting a menu or an icon.

For convenience of description, a flicking input may be referred to as a touch input of a first pattern, and a touch input for selecting an icon or a menu may be referred to as a touch input of a second pattern. It will be understood by those skilled in the art that the aspects and features described herein may be used to discriminate a variety of touch inputs from one another.

Figure 5:
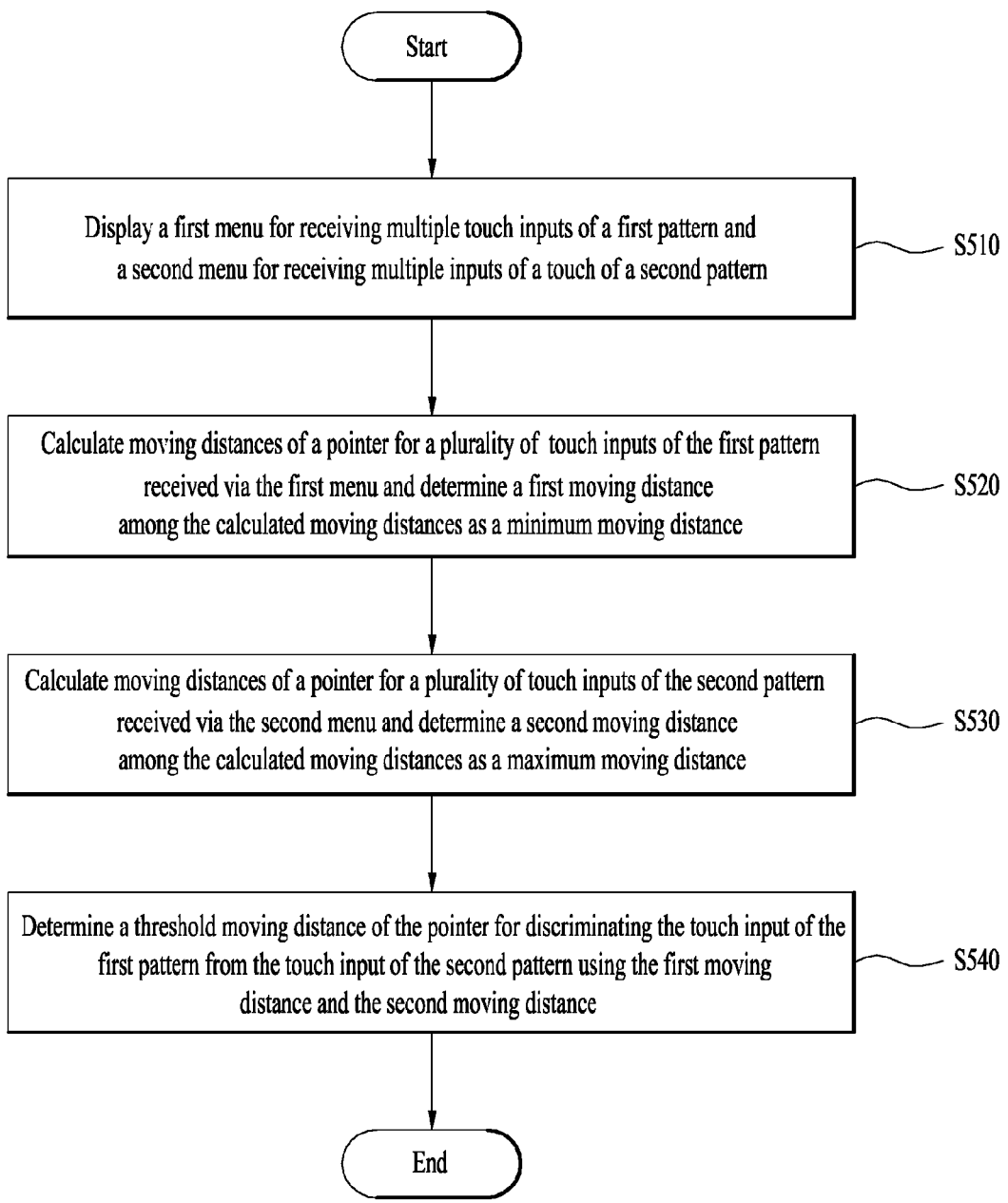
FIG. 5 is a flowchart illustrating a method for determining a pointer threshold moving distance for discriminating a touch input of a first pattern and a touch input of a second pattern from each other using a plurality of previously input touch inputs according to an embodiment of the present invention.

FIG. 5 is a flowchart illustrating a method for determining a pointer threshold moving distance for discriminating a touch input of a first pattern from a touch input of a second pattern using a plurality of previously input touch inputs according to an embodiment of the present invention.

Referring to FIG. 5, a menu for receiving a touch input of a first pattern multiple times and/or a menu for receiving a touch input of a second pattern multiple times may be displayed on a touchscreen [S510]. For convenience of description, a menu for receiving a touch input of a first pattern multiple times will be referred to as a first menu, and a menu for receiving a touch input of a second pattern multiple times will be referred to as a second menu.

It is not required that the first menu and the second menu be displayed in any particular order. According to embodiments of the present invention, the order in which the first menu and the second menu are displayed is not significant. The first menu and the second menu will be described in more detail later with reference to FIGS. 7A-C, 8A-B, 10A-B, and 11A-B.

With reference back to FIG. 5, if a touch input of a first pattern is input via the first menu multiple times, the controller 180 calculates (or measures) a moving distance of the pointer for each touch input and then determines a minimum moving distance among the calculated moving distances [S520]. For convenience of description, the minimum moving distance used for determining a threshold moving distance is referred to as a first moving distance and will be described in more detail later.

If a touch input of a second pattern is input via the second menu multiple times, the controller 180 calculates (or measures) a moving distance of the pointer for each touch input and then determines a maximum moving distance among the calculated moving distances [S530]. For convenience of description, the maximum moving distance also used for determining a threshold moving distance is referred to as a second moving distance and will be described in more detail later.

As illustrated in FIG. 5, the first moving distance is determined [S520] before the second moving distance is determined [S530]. However, it is understood that the illustrated sequence may be reversed—i.e., the second moving distance may be determined [S530] before the first moving distance is determined [S520].

Once the first moving distance and the second moving distance are determined, the controller 180 may determine a threshold moving distance of the pointer using the first moving distance and the second moving distance [S540]. The threshold moving distance is for discriminating the touch input of the first pattern from the touch input of the second pattern. According to an embodiment, the threshold moving distance may be equal to an average value of the first and second moving distances.

When a touch input of the first pattern and a touch input of the second pattern are discriminated from each other using a threshold distance that is determined for a particular user(s), a more convenient user interface is provided.

Figure 6A:
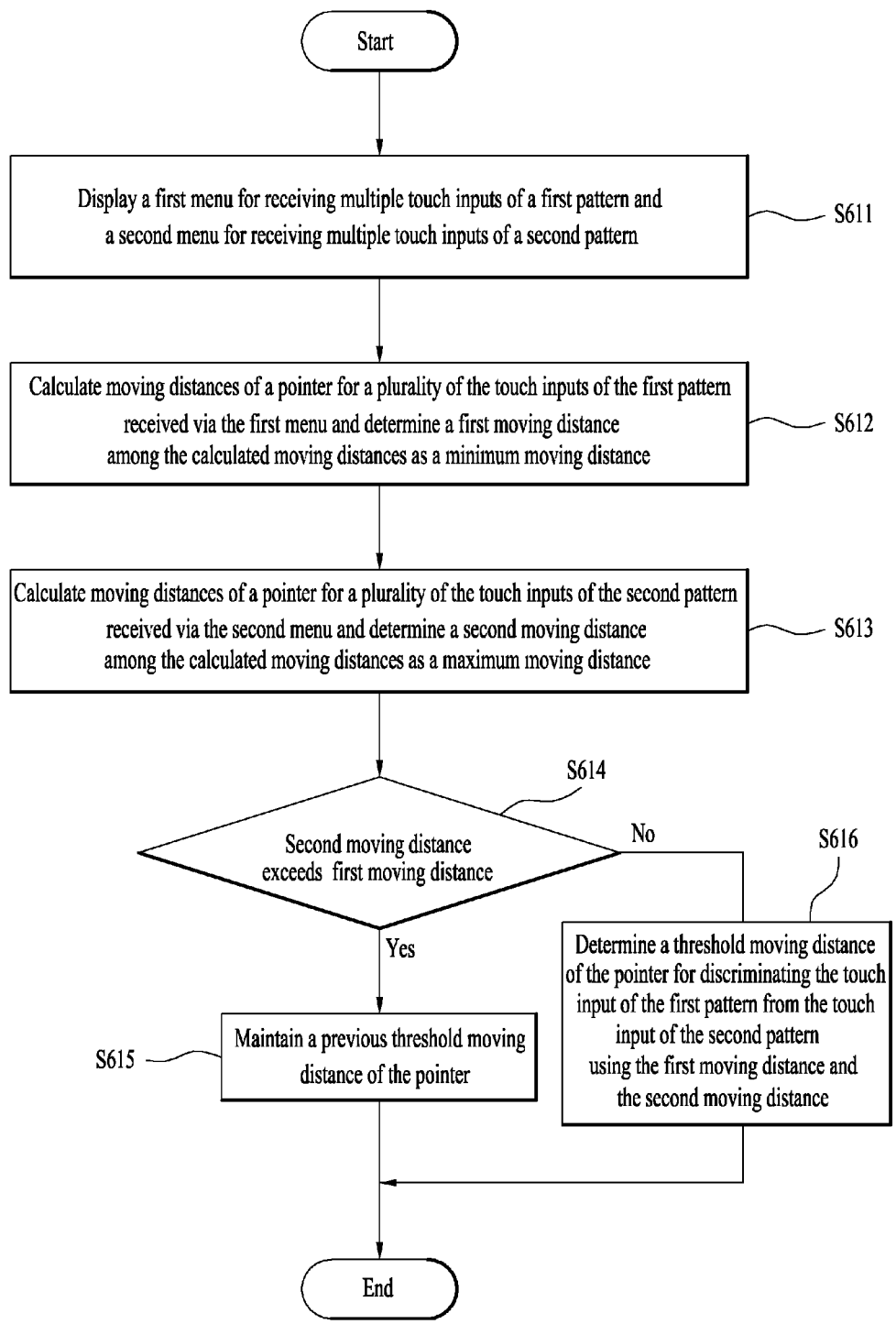
FIGS. 6A, 6B and 6C are flowcharts illustrating a method for determining a pointer threshold moving distance according to embodiments of the present invention.
Figure 6B:
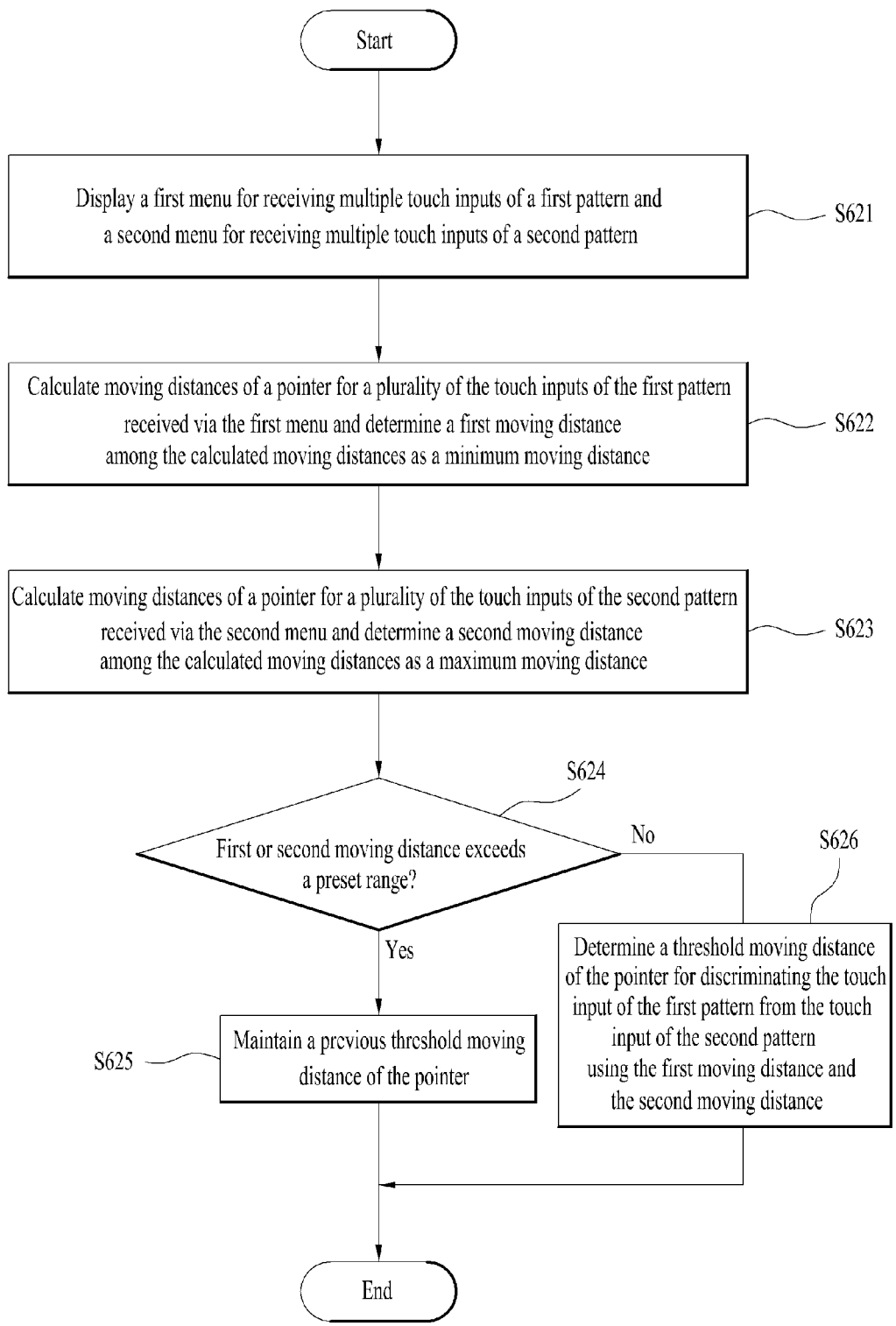
Figure 6C:
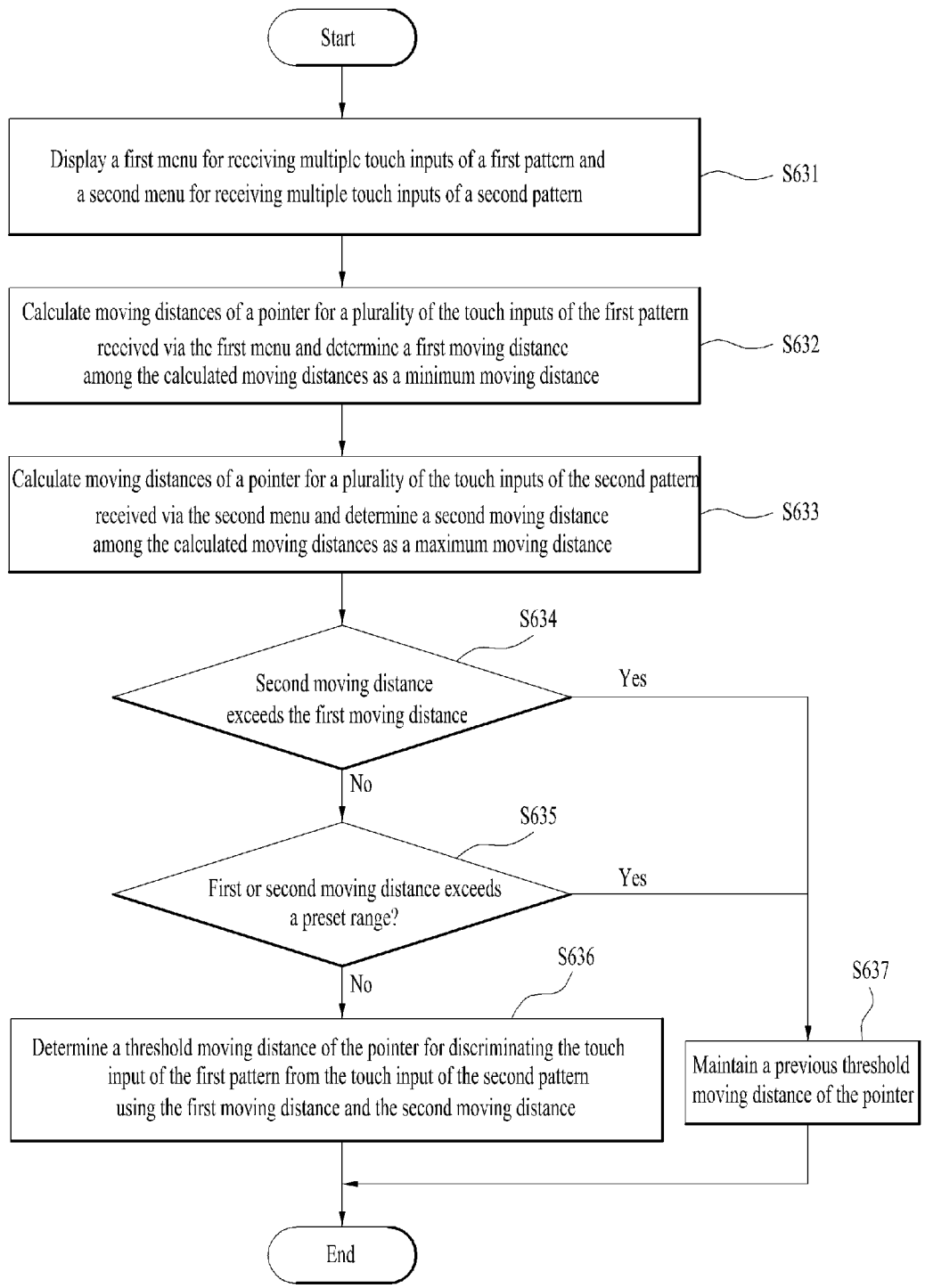

Methods according to various embodiments are disclosed with reference to FIGS. 6A-C. As will be explained in more detail, it is understood that the controller 180 may treat the user input as an error if a user input meets a preset condition and may maintain a previous pointer threshold moving distance. As such, errors caused by an incorrect touch input performed by a user may be prevented or reduced.

Referring to FIG. 6A, steps S611, S612, and S613 substantially correspond to step S510, S520, and S530 of FIG. 5, respectively. Therefore, further details regarding steps S611, S612, and S613 will not be presented.

After a first moving distance and a second moving distance have been determined, the controller 180 may determine whether the second moving distance exceeds the first moving distance [S614]. As described previously, a moving distance of a pointer used for performing a flicking input is greater than a moving distance of a pointer used for performing a touch input for selecting an icon.

Therefore, the controller 180 may determine that an incorrect touch has been input by a user if the second moving distance exceeds the first moving distance. As such, the controller 180 maintains a previous threshold moving distance of a pointer [S615].

In contrast, the controller 180 may determine a new threshold moving distance of the pointer based on the first moving distance and the second moving distance [S616] if it is determined that the second moving distance does not exceed the first moving distance.

Referring to FIG. 6B, steps S621, S622, and S623 substantially correspond to steps S510, S520, and S530 of FIG. 5, respectively. Therefore, further details regarding steps S621, S622, S623 will not be presented.

After a first moving distance and a second moving distance have been determined, the controller 180 may determine whether the first or second moving distance exceeds (or is outside of) a preset range [S624]. The preset range may be set when manufacturing the mobile terminal 100 or may be modified by a user.

It may be difficult to provide a smooth or more effective user interface if a threshold moving distance is calculated based on an incorrect touch input performed by a user. Hence, a value of the first or second moving distance that exceeds an established reference is ignored. For example, the controller 180 maintains a previous threshold moving distance of a pointer [S625] if the first or second moving distance exceeds the preset range.

In contrast, the controller 180 determines a new threshold moving distance of the pointer based on the first moving distance and the second moving distance [S626] if it is determined that the first moving distance and the second moving distance do not exceed the preset range.

The flowchart of FIG. 6C employs features described earlier with reference to both FIG. 6A and FIG. 6B. Referring to FIG. 6C, steps S631, S632, and S633 substantially correspond to steps S510, S520, and S530 of FIG. 5, respectively. Therefore, further details regarding steps S631, S632, S633 will not be presented.

As illustrated in FIG. 6C, the controller 180 determines whether the second moving distance exceeds the first moving distance [S634] and whether the first or second moving distance exceeds a preset range [S635]. If it is determined that any one of these conditions is met, the controller 180 maintains a previous threshold moving distance of a pointer [S637]. Otherwise, the controller 180 determines a new threshold moving distance of the pointer based on the first moving distance and the second moving distance [S636].

According to embodiments of the present invention, a touch of a first pattern may be input via a first menu in at least one of a plurality of preset directions. This will be described in more detail with reference to FIGS. 7A-C.

Figure 7A:
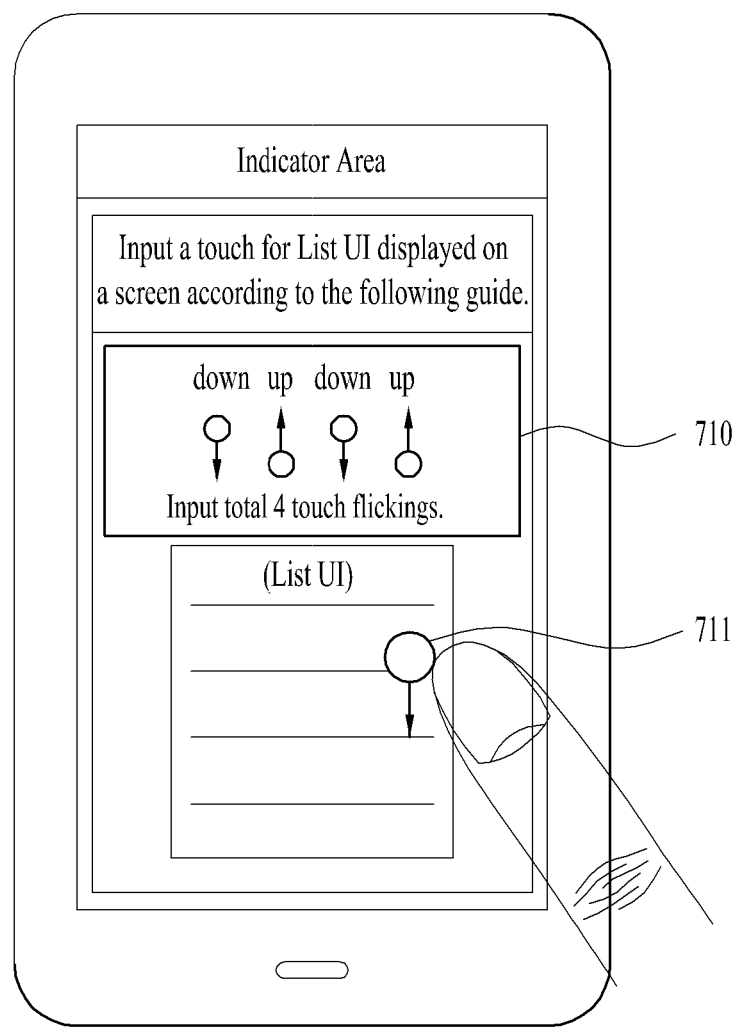
FIGS. 7A, 7B and 7C are views of screen displays for illustrating reception of a plurality of flicking inputs in at least one of a plurality of preset directions according to embodiments of the present invention.

Referring to FIG. 7A, a plurality of flickings may be input in a plurality of up and down directions 710 (e.g., vertical directions). Thus, a user is able to input a down direction flicking 711.

Figure 7B:
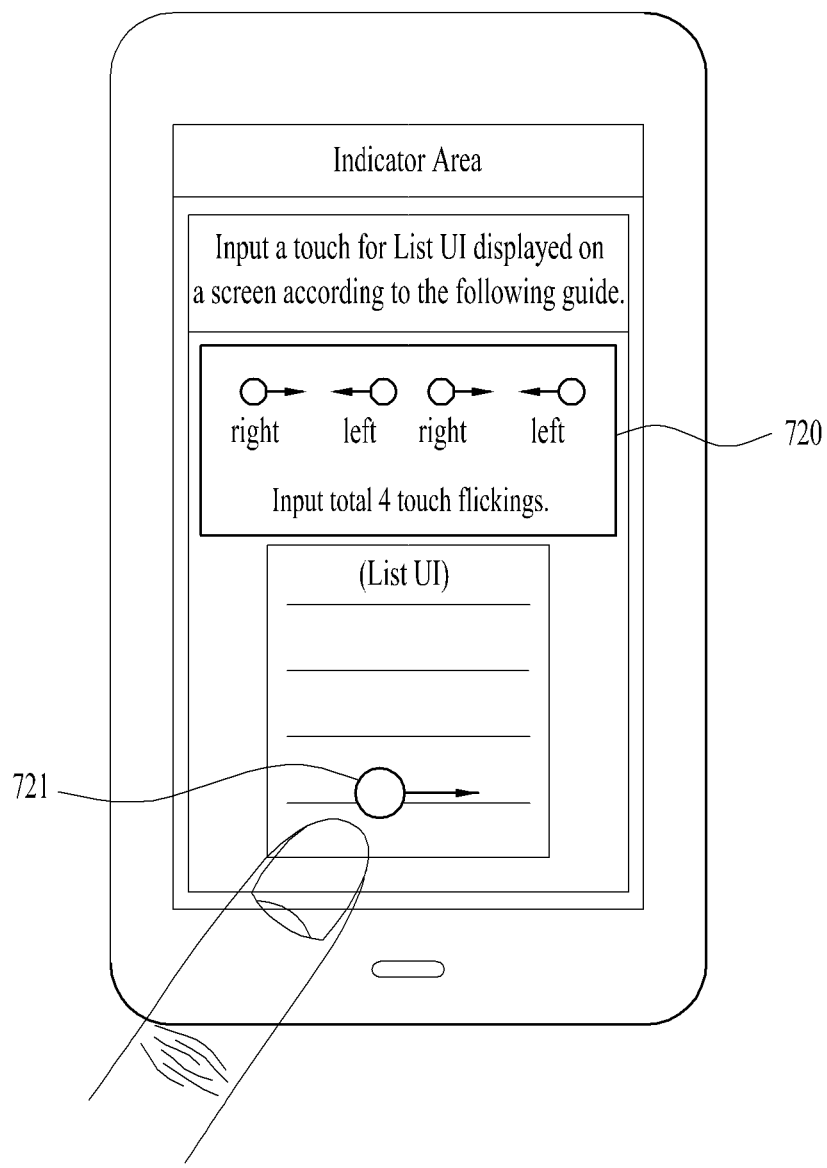

Referring to FIG. 7B, a plurality of flickings may be input in a plurality of right and left directions 720 (e.g., horizontal directions). Thus, a user is able to input a right direction flicking 721.

Figure 7C:
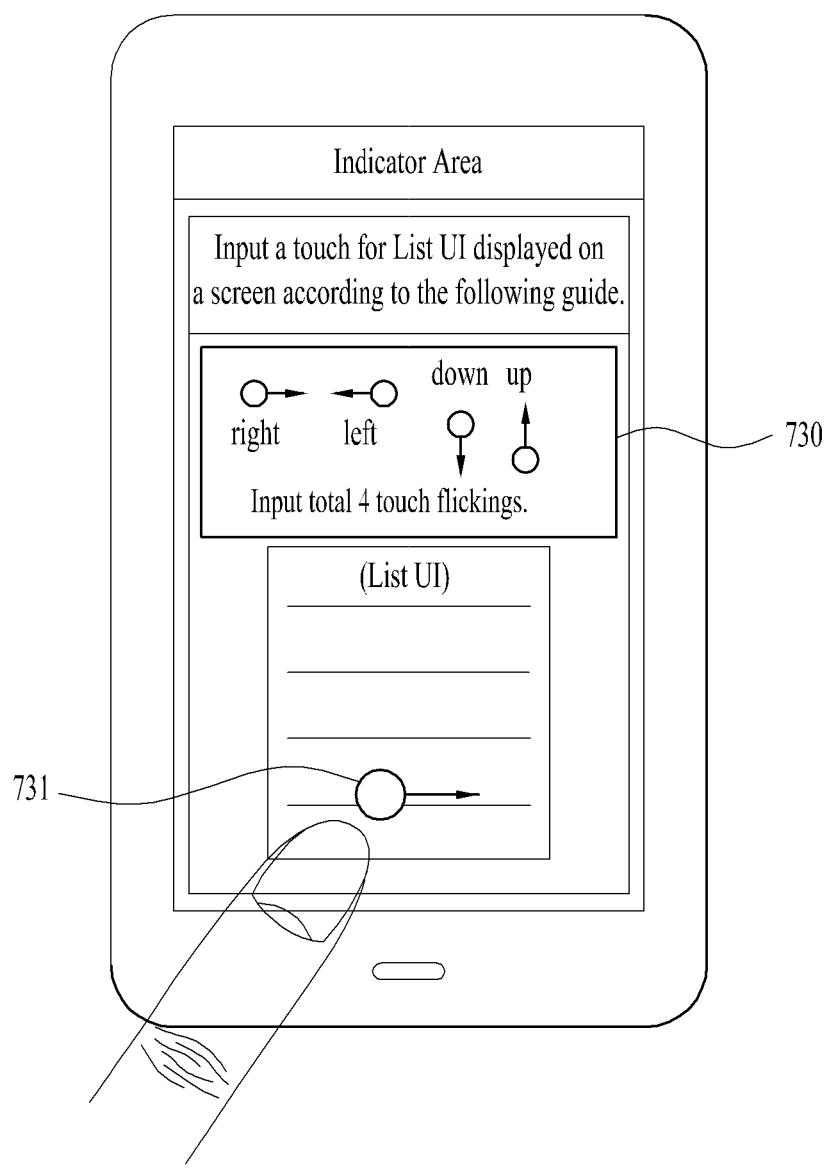

Referring to FIG. 7C, a plurality of flickings may be input in a plurality of right, left, up and down directions 730 (e.g., horizontal and vertical directions). Thus, a user is able to input a right direction flicking 731.

When a user provides flicking inputs with respect to various directions, a first moving distance may be measured more accurately. According to embodiments of the present invention, flicking inputs are performed using a plurality of pointers and with respect to a plurality of preset directions. When a first moving distance is determined based on inputs performed using various kinds of pointers, a threshold moving distance can be determined more accurately. This will be described in more detail with reference to FIGS. 8A and 8B.

Figure 8A:
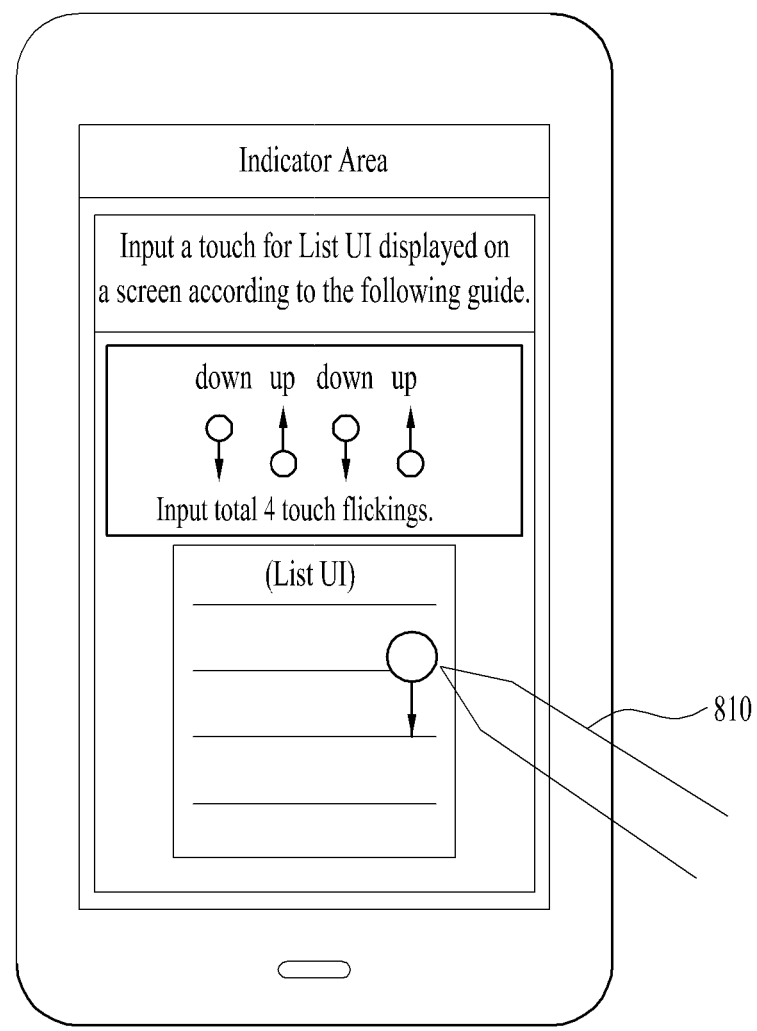
FIGS. 8A and 8B are views of screen displays for illustrating reception of a flicking input in a plurality of directions previously set for a plurality of pointers according to embodiments of the present invention.
Figure 8B:
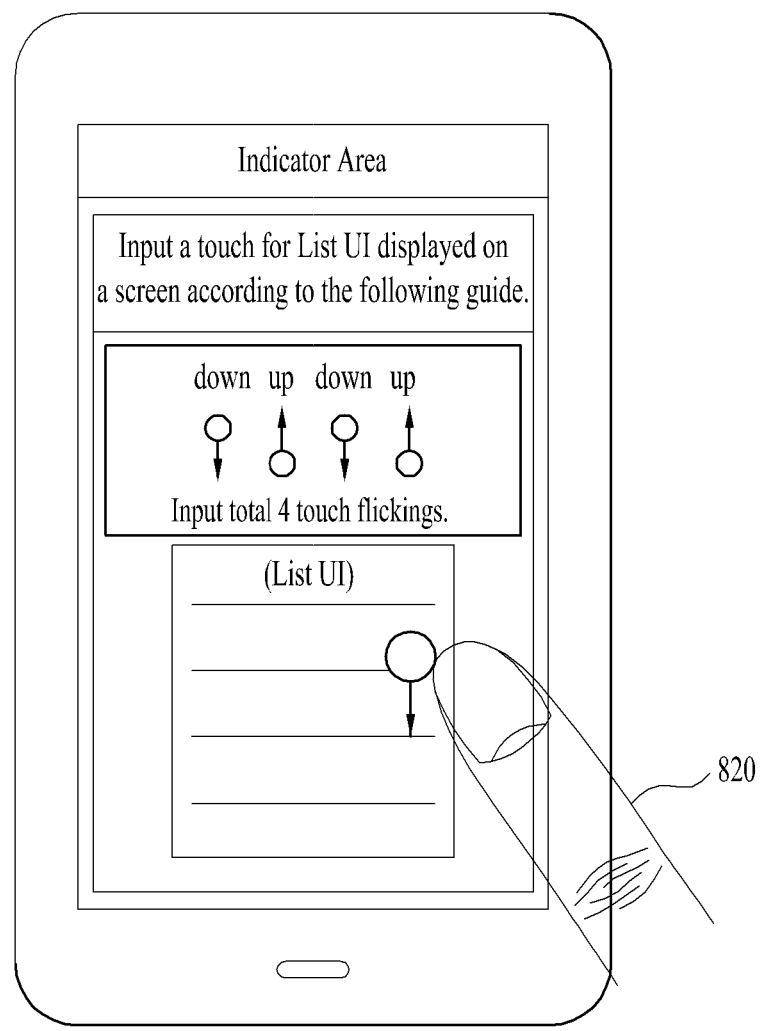

Referring to FIG. 8A, a plurality of flickings may be input using a stylus pen 810. Referring to FIG. 8B, a plurality of flickings may be input using a finger 820. It is understood that a stylus pen and a finger are examples of pointers and that these or other kinds of pointers may be employed.

According to an embodiment of the present invention, a first moving distance can be set to an average value of pointer moving distances for a preset number of touch inputs of a first pattern. Moreover, a touch input (e.g., a flicking input) in which a moving direction is changed at least once in the course of performing the touch input is treated as an erroneous input. This will be described in more detail with reference to FIG. 9.

Figure 9:
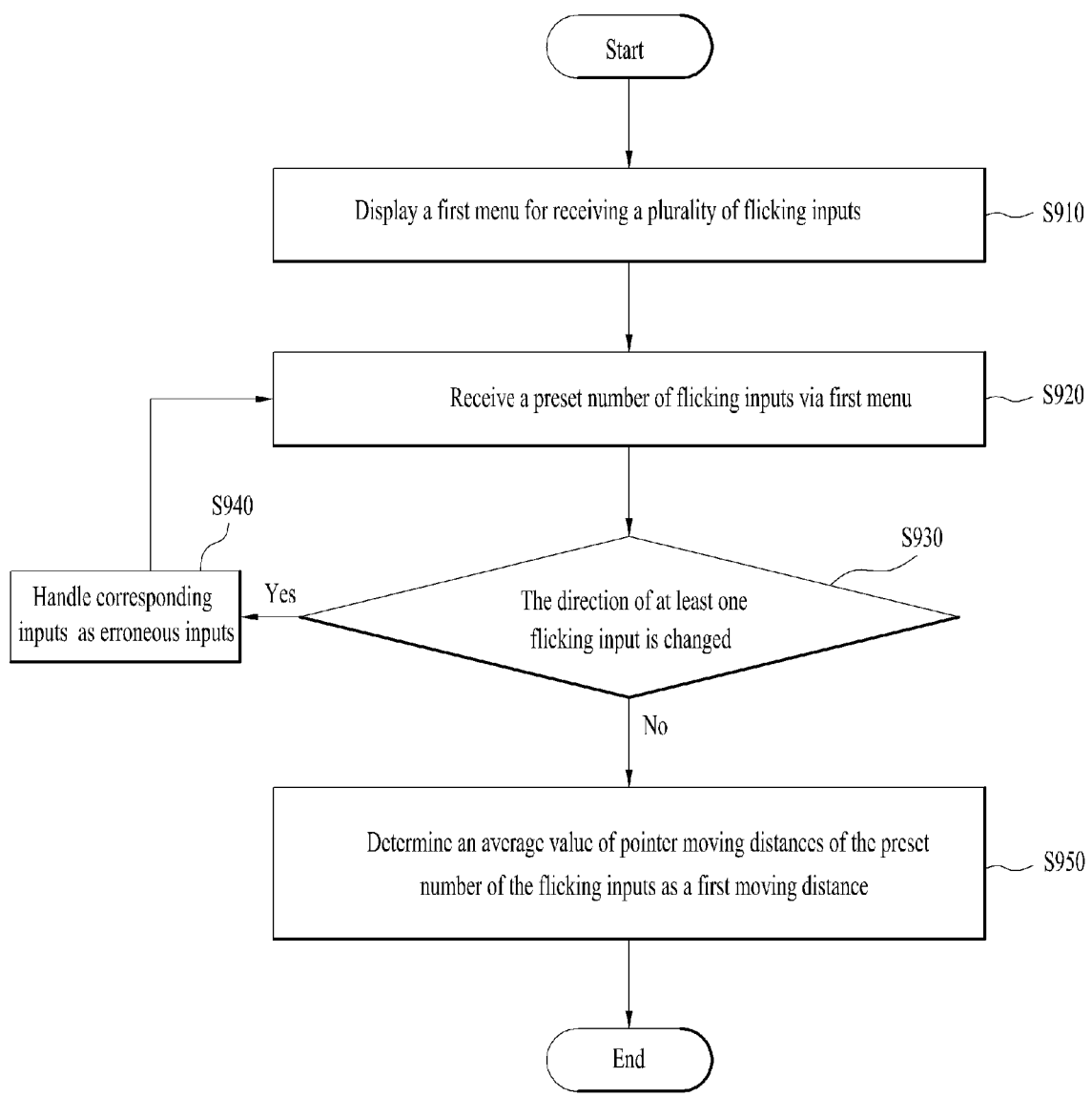
FIG. 9 is a flowchart illustrating a method for determining a first moving distance based on a plurality of flicking inputs, each of which meets a preset condition, according to an embodiment of the present invention.

In the embodiment of FIG. 9, a first moving distance is set to an average value of pointer moving distances corresponding to a preset number of touch inputs of a first pattern. A flicking input in which a moving direction is changed is treated as an erroneous input. It is understood that other embodiments may employ either of these individual features.

FIG. 9 is a flowchart illustrating a method for determining a first moving distance based on a plurality of flicking inputs, each of which meets a preset condition, according to one embodiment of the present invention. Referring to FIG. 9, a first menu is displayed on a prescribed region of a touchscreen for receiving a plurality of flicking inputs [S910]. A plurality of touch inputs of a first pattern (i.e., flicking inputs) may be input via the first menu [S920].

Among the plurality of touch inputs, at least one input may be a flicking input in which a moving direction is changed at least once during the course of performing the input. Such an input may be handled as an erroneous input.

The controller 180 determines whether at least one input is a flicking input in which a moving direction is changed at least once [S930]. If the controller determines at least one input is a flicking input in which a moving direction is changed at least once, the controller 180 handles the corresponding input(s) as erroneous input(s) [S940].

When performance of a preset number of flicking inputs is completed through the above-described error handling process such that none of the inputs is a flicking input in which a moving direction is changed at least once, the controller 180 calculates an average value of the pointer moving distances for the preset number of flicking inputs as a first moving distance [S950].

With reference back to FIG. 5, the first moving distance among the calculated moving distances is determined as a minimum moving distance [S520]. Referring to FIG. 9, a more accurate pointer threshold moving distance may be determined by calculating the pointer moving distances for a preset number of flicking inputs and then determining an average value of the calculated moving distances as the first moving distance.

Figure 10A:
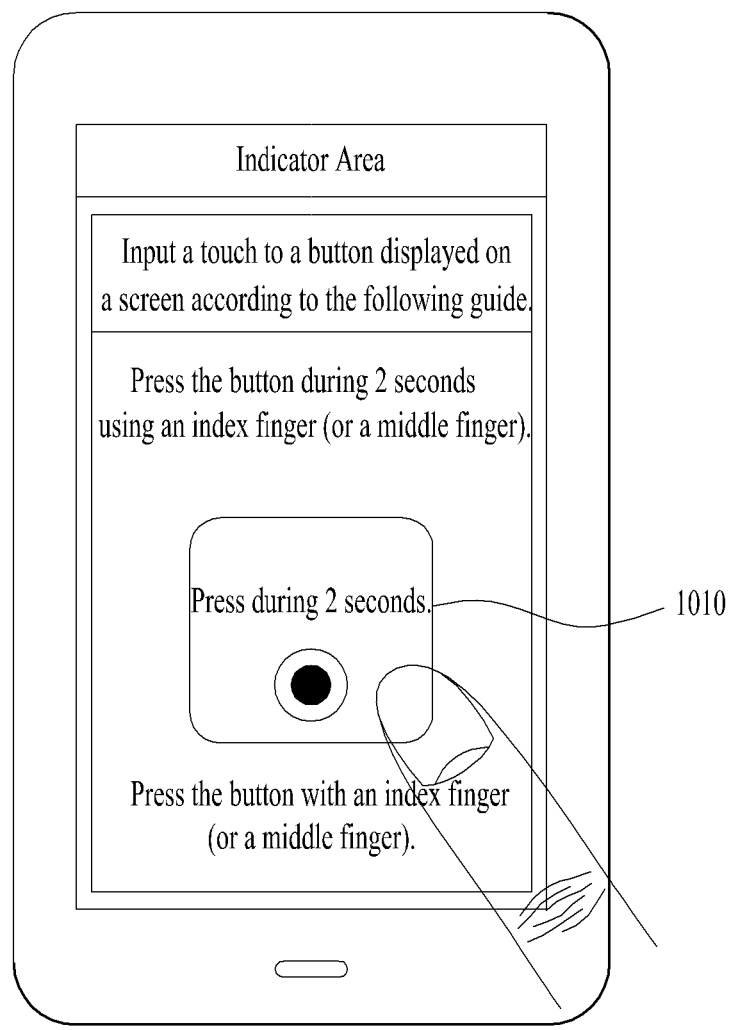
FIGS. 10A and 10B are views of screen displays for illustrating reception of a plurality of touch inputs of a second pattern during a plurality of preset time intervals according to embodiments of the present invention.
Figure 10B:
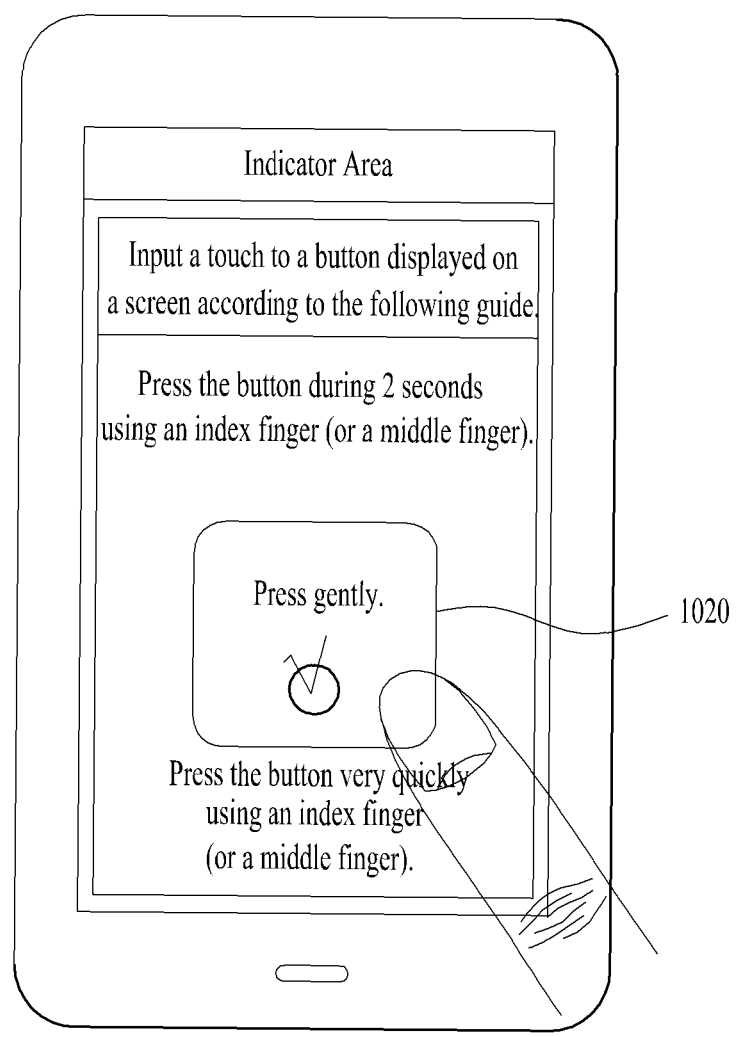

According to one embodiment of the present invention, a touch input of a second pattern may be input via a second menu during a plurality of preset time intervals. This is described with reference to FIGS. 10A and 10B. FIGS. 10A and 10B are views of screen displays for illustrating reception of a plurality of touch inputs of a second pattern during a plurality of preset time intervals according to an embodiment of the present invention.

Referring to FIG. 10A, a touch input of a second pattern is received during a preset 2-second interval 1010. Referring to FIG. 10B, a touch input of a second pattern is received in a very short preset touch interval 1020. Therefore, the second moving distance may be calculated more accurately by receiving a plurality of touch inputs of a second pattern during a plurality of time intervals.

Figure 11A:
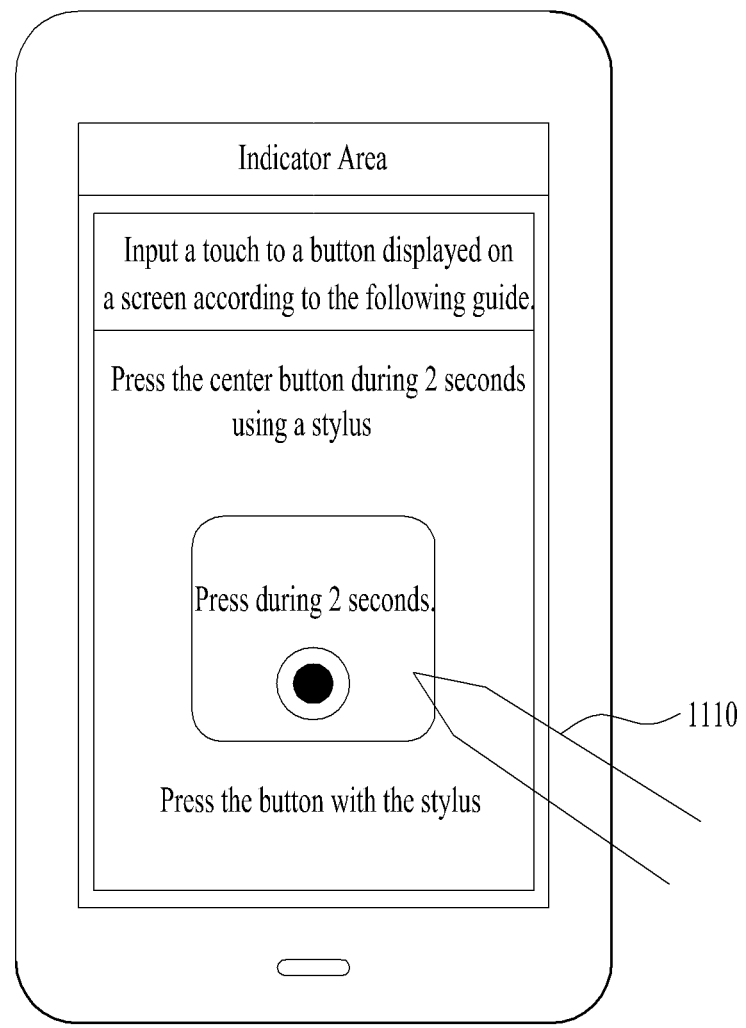
FIGS. 11A and 11B are views of screen displays for illustrating reception of a touch input of a second pattern in a plurality of directions respectively set for a plurality of pointers according to embodiments of the present invention.
Figure 11B:
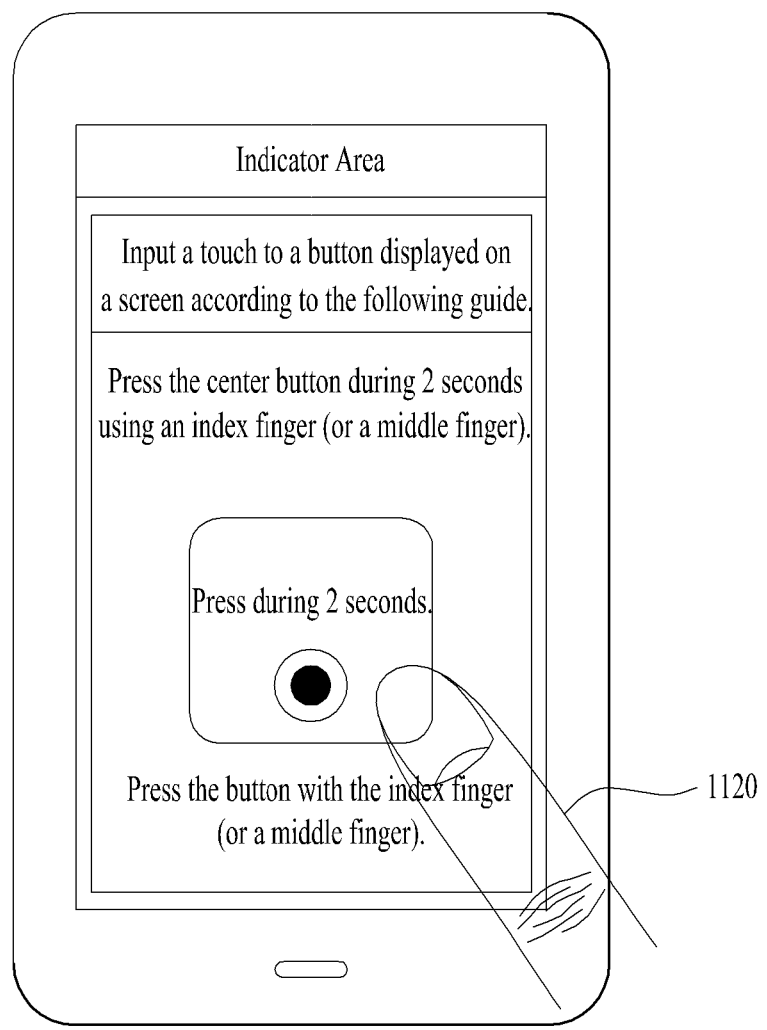

According to one embodiment of the present invention, touch inputs of a second pattern are received using a plurality of pointers. This is described with reference to FIGS. 11A and 11B. FIGS. 11A and 11B are views of screen displays for illustrating reception of a plurality of touch inputs of a second pattern using a plurality of pointers according to one embodiment of the present invention.

Referring to FIG. 11A, a plurality of touch inputs of a second pattern are input via a stylus pen 1110. Referring to FIG. 11B, a plurality of touch inputs of a second pattern are input via a finger 1120. A stylus pen and a finger are examples of pointers that may be used. It is understood these or other kinds of pointers may be employed. A threshold moving distance may be determined more accurately when the second moving distance is determined based on touch inputs performed using various kinds of pointers.

Figure 12:
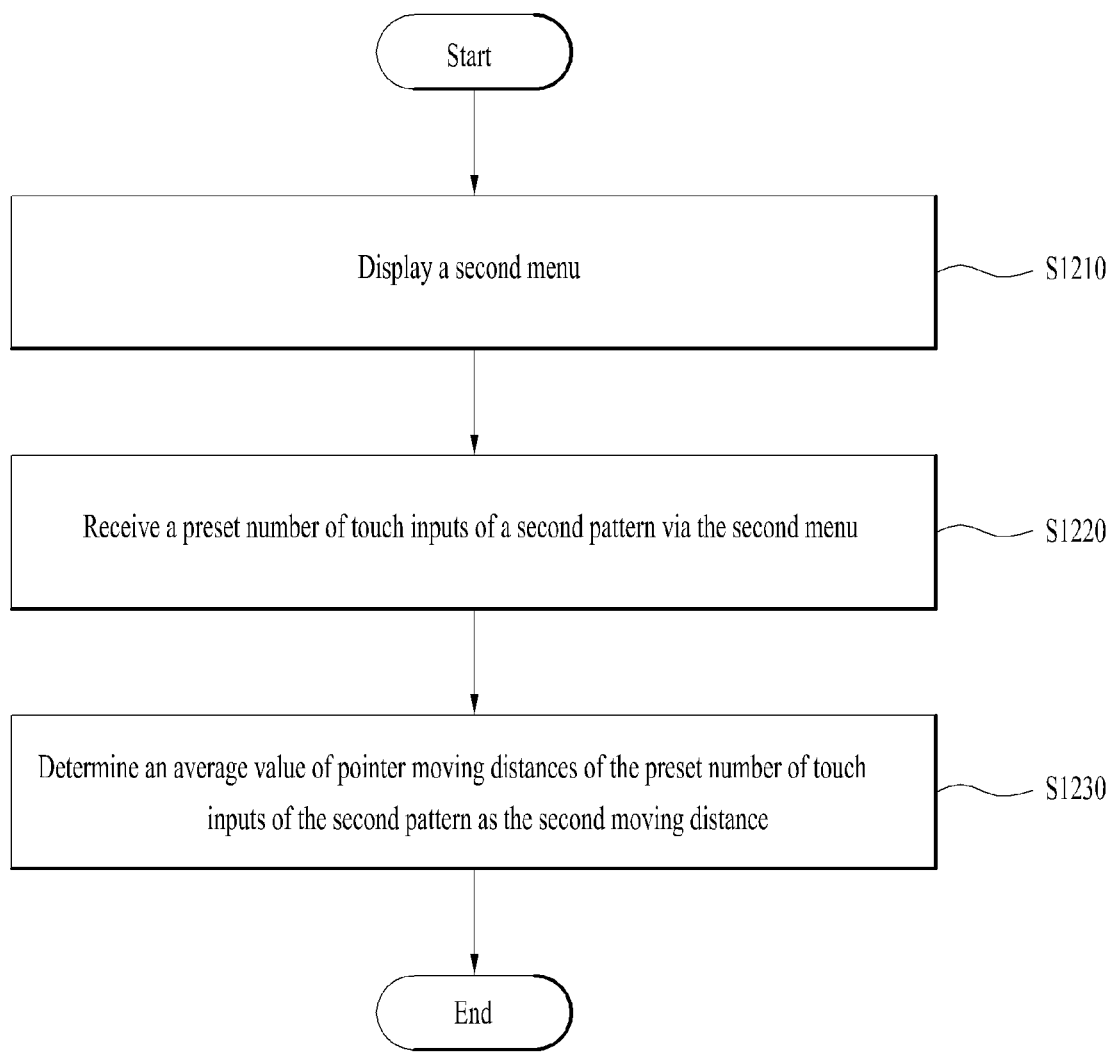
FIG. 12 is a flowchart illustrating a method for determining a second moving distance based on a plurality of touch inputs of a second pattern, each of which meets a preset condition, according to an embodiment of the present invention.

According to one embodiment of the present invention, the second moving distance may be set to an average value of pointer moving distances for a preset number of touch inputs of a second pattern. This will be described in more detail with reference to FIG. 12. FIG. 12 is a flowchart illustrating a method for determining the second moving distance based on a plurality of touch inputs of a second pattern according to an embodiment of the present invention.

Referring to FIG. 12, a second menu is displayed on a prescribed region of a touchscreen [S1210], and a preset number of touch inputs of a second pattern are received via the second menu [S1220]. The controller 180 calculates an average value of the pointer moving distances for the touch inputs when performance of the preset number of the touch inputs is completed. The average value is determined as the second moving distance [S1230].

Referring back to FIG. 5, the second moving distance is set as the pointer maximum moving distance for the touch inputs of the second pattern (FIG. 5, [S530]). With reference to FIG. 12, a more accurate pointer threshold moving distance may be determined by calculating the pointer moving distance for each of a preset number of touch inputs of the second pattern and then determining an average value of the calculated moving distances as the second moving distance.

The embodiments of the present invention may be implemented in a computer-readable storage medium as computer-readable code. The computer-readable media may include any kind of recording device in which data readable by a computer system are stored. The computer-readable media may include ROM, RAM, CD-ROM, magnetic tapes, floppy discs, or optical data storage devices, and may also include carrier-wave type implementations such as for transmission via the Internet.

The aforementioned mobile terminal including the display unit may be based on a combination of structural elements and features described herein. Each of the structural elements or features may be considered as an independent structural element or feature unless specified otherwise. Each of the structural elements or features may be implemented independently with respect to other structural elements or features. Also, at least some structural elements or features may be combined with one another according to embodiments of the present invention.

It will be apparent to those skilled in the art that various modifications and variations can be made in the present invention without departing from the spirit or scope of the invention. Thus, it is intended that the present invention covers modifications and variations of the invention provided they come within the scope of the appended claims and their equivalents.

What is claimed is:

1. A mobile terminal comprising:
   a touchscreen configured to:
      display a first menu;
      receive a plurality of touch inputs of a first pattern via the first menu;
      display a second menu; and
      receive a plurality of touch inputs of a second pattern via the second menu;
   a memory configured to store a preset threshold moving distance of a pointer for discriminating the plurality of touch inputs of the first pattern from the plurality of touch inputs of the second pattern; and
   a controller configured to:
      determine whether each of the received plurality of touch inputs of the first pattern correspond to several guide information included in the first menu, the several guide information providing an interface indicating a moving direction of each of the plurality of touch inputs of the first pattern, wherein, when each of the received plurality of touch inputs of the first pattern correspond to respective ones of the several guide information, the controller is further configured to:
      calculate a first moving distance of the pointer for each of the received plurality of touch inputs of the first pattern;
      determine a minimum moving distance among the plurality of calculated first moving distances;

calculate a second moving distance of the pointer for each of the received plurality of touch inputs of the second pattern;

determine a maximum moving distance among the plurality of calculated second moving distances;

determine a new threshold moving distance of the pointer for discriminating the plurality of touch inputs of the first pattern from the plurality of touch inputs of the second pattern by using the determined minimum and maximum moving distance; and replace the preset threshold moving distance in the memory with the determined new threshold moving distance if the maximum moving distance does not exceed a preset range; and maintain the preset threshold moving distance if the maximum moving distance exceeds the preset range.

2. The mobile terminal of claim 1, wherein:

each of the plurality of touch inputs of the first pattern comprises a flicking input; and each of the plurality of touch input of the second pattern comprises a touch input for selecting an icon or a menu.

3. The mobile terminal of claim 2, wherein the controller is further configured to treat the flicking input as an erroneous input if a flicking input moving direction changes at least once.

4. The mobile terminal of claim 1, wherein the controller is further configured to determine the new threshold moving distance as an average of the minimum moving distance and the maximum moving distance.

5. The mobile terminal of claim 1, wherein the controller is further configured to maintain the preset threshold moving distance if the maximum moving distance is greater than the minimum moving distance.

6. The mobile terminal of claim 1, wherein the controller is further configured to maintain the preset threshold moving distance if the minimum moving distance exceeds the preset range.

7. The mobile terminal of claim 1, wherein:

the touchscreen is further configured to receive a preset number of the plurality of touch inputs of the first pattern via the first menu; and the controller is further configured to calculate an average value of pointer moving distances of the preset number of the plurality of touch inputs of the first pattern.

8. The mobile terminal of claim 1, wherein the touchscreen is further configured to receive the plurality of touch inputs of the second pattern via the second menu during a plurality of preset time intervals.

9. The mobile terminal of claim 1, wherein:

the touchscreen is further configured to receive a preset number of the plurality of touch inputs of the second pattern via the second menu; and the controller is further configured to calculate an average value of pointer moving distances of the preset number of the plurality of touch inputs of the second pattern.

10. A method of controlling a mobile terminal, the method comprising:

storing, in a memory of the mobile terminal, a preset threshold moving distance of a pointer for discriminating a plurality of touch inputs of a first pattern from a plurality of touch inputs of a second pattern;

displaying, by a touchscreen of the mobile terminal, a first menu for receiving the plurality of touch inputs of the first pattern; and determining by the controller whether each of the received plurality of touch inputs of the first pattern correspond to several guide information included in the first menu, the several guide information providing an interface indicating a moving direction of each of the plurality of touch inputs of the first pattern, wherein, when each of the received plurality of touch inputs of the first pattern correspond to respective ones of the several guide information, further comprising:

displaying, by the touchscreen, a second menu for receiving the plurality of touch inputs of the second pattern;

calculating, by the controller, a first moving distance of the pointer for each of the received plurality of touch inputs of the first pattern;

determining, by the controller, a minimum moving distance among the plurality of calculated first moving distances;

calculating, by the controller, a second moving distance of the pointer for each of the received plurality of touch inputs of the second pattern;

determining, by the controller, a maximum moving distance among the plurality of calculated second moving distances;

determining, by the controller, a new threshold moving distance of the pointer for discriminating the plurality of touch inputs of the first pattern from the plurality of touch inputs of the second pattern by using the determined minimum and maximum moving distance; and replacing the preset threshold moving distance in the memory with the determined new threshold moving distance if the maximum moving distance does not exceed a preset range; and maintaining, by the controller, the preset threshold moving distance if the maximum moving distance exceeds the preset range.

11. The method of claim 10, wherein:

each of the plurality of touch inputs of the first pattern comprises a flicking input; and each of the plurality of touch inputs of the second pattern comprises a touch input for selecting an icon or a menu.

12. The method of claim 11, further comprising treating the flicking input as an erroneous input if a flicking input moving direction changes at least once.

13. The method of claim 10, further comprising maintaining, by the controller, the preset threshold moving distance if the maximum moving distance is greater than the minimum moving distance.

14. The method of claim 10, further comprising maintaining, by the controller, the preset threshold moving distance if the minimum moving distance exceeds the preset range.

15. The method of claim 10, wherein determining the new threshold moving distance comprises determining an average of the minimum moving distance and the maximum moving distance.

16. The method of claim 10, further comprising:

receiving a preset number of the plurality of touch inputs of the first pattern via the first menu; and calculating an average value of pointer moving distances of the preset number of the plurality of touch inputs of the first pattern.

17. The method of claim 10, further comprising receiving the plurality of touch inputs of the second pattern via the second menu during a plurality of preset time intervals.

18. The method of claim 10, further comprising:

receiving a preset number of the plurality of touch inputs of the second pattern via the second menu; and calculating an average value of pointer moving distances of the preset number of the plurality of touch inputs of the second pattern.

* * * * *